United States Patent [19]
Satoh et al.

[11] 3,858,112
[45] Dec. 31, 1974

[54] RECEIVER CIRCUIT INCLUDING A CRYSTAL RESONATOR FOR NUCLEAR MAGNETIC RESONANCE SIGNALS OF TWO DIFFERENT FREQUENCIES

[75] Inventors: Yoshiaki Satoh; Hidefumi Funaki, both of Tokyo, Japan

[73] Assignee: Nippon Electric Varian, Ltd., Tokyo, Japan

[22] Filed: Sept. 20, 1973

[21] Appl. No.: 399,169

[52] U.S. Cl.................. 324/.5 R, 325/489, 333/72, 333/76
[51] Int. Cl. ........................................... G01n 27/78
[58] Field of Search ........... 324/.5 A, .5 AC, .5 AH; 325/379, 382, 489; 333/72, 76

[56] References Cited
UNITED STATES PATENTS
3,434,043  3/1969  Nelson ........................... 324/.5 AC Primary Examiner—Michael J. Lynch
Attorney, Agent, or Firm—Hopgood, Calimafde, Kalil, Blaustein & Lieberman

[57] ABSTRACT

A receiver circuit for a nuclear magnetic resonance analyser includes a resonance circuit and an amplifier circuit. The resonance circuit includes a receiving coil for detecting nuclear magnetic resonance signals of two different frequencies and a crystal resonator connected in series with the receiving coil. The crystal resonator being chosen so that it is substantially inductive at the lower of the two frequencies and is substantially capacitive at the higher of the two frequencies. The output impedance of the resonance circuit is matched to the input impedance of an amplifier circuit to which it is attached at the two different frequencies. By use of this circuit signals of the two different frequencies may be amplified by a single amplifier.

5 Claims, 11 Drawing Figures

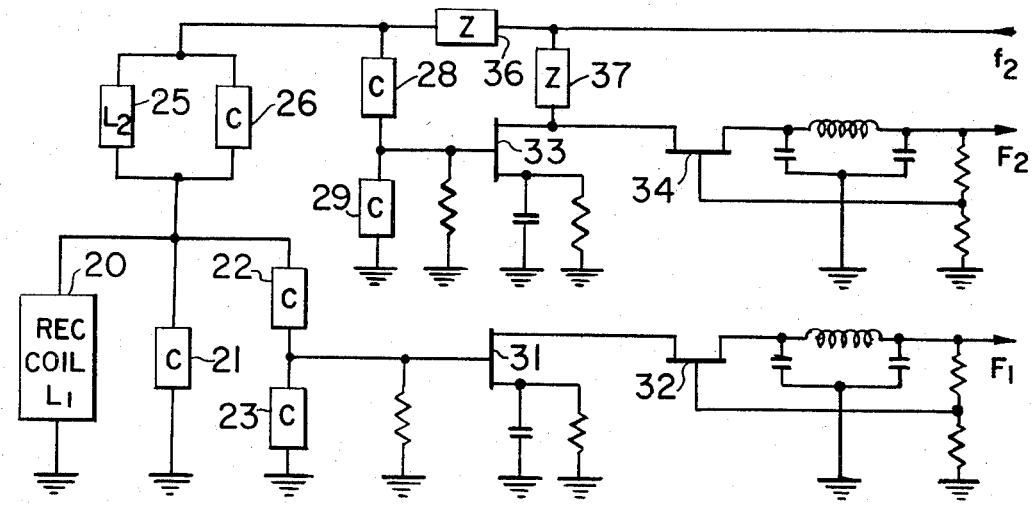
(PRIOR ART)
FIG. 1
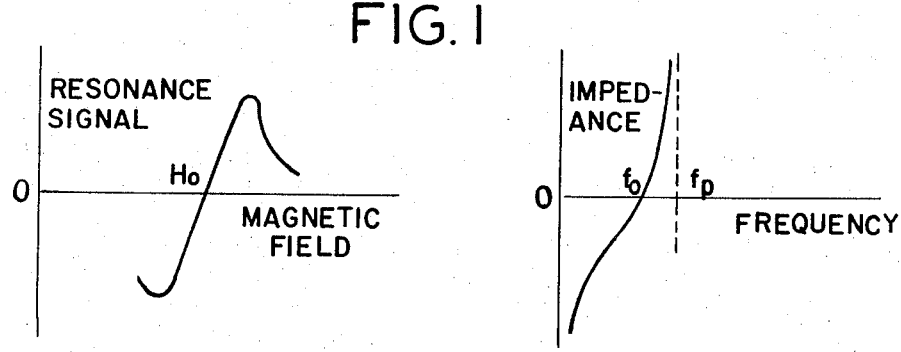
FIG. 2
FIG. 4
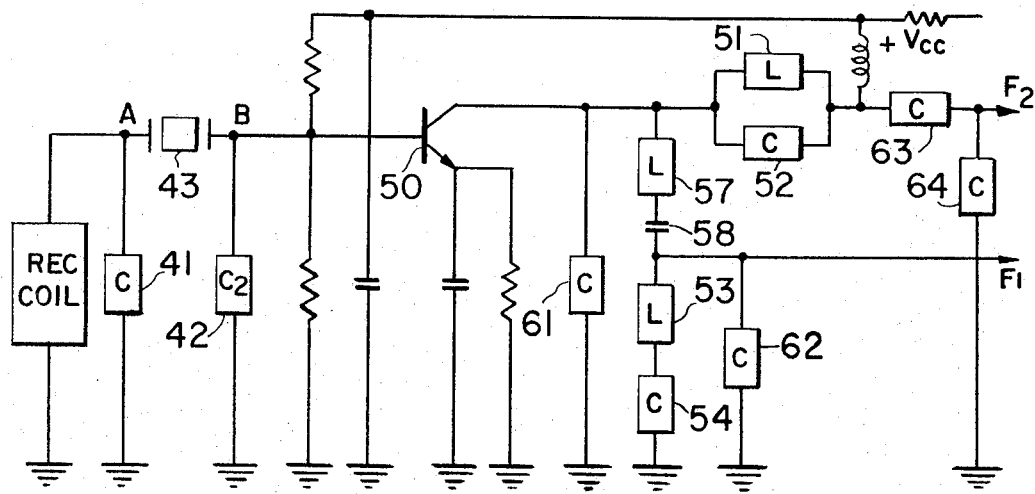
FIG. 3

RECEIVER CIRCUIT INCLUDING A CRYSTAL RESONATOR FOR NUCLEAR MAGNETIC RESONANCE SIGNALS OF TWO DIFFERENT FREQUENCIES

BACKGROUND OF THE INVENTION

This invention relates to a receiver circuit which is usable for a probe preamplifier of a nuclear magnetic resonance analyser, and in particular to such a circuit for receiving nuclear magnetic resonance signals of different frequencies, such as the signals resulting from an analysis system and a locking system of a nuclear magnetic resonance analyser.

A nuclear magnetic resonance analyser generally comprises an analysis system for observing the nuclear magnetic resonance spectrum of a sample of material to be analysed and a locking system which avoids variation in the frequency of the high-frequency magnetic field of the analyser during observation. The analysis system makes use of the nuclei of atoms such as $^1H$, $^{19}F$, $^{13}C$, and the like. The locking system makes use of the nuclei of $^2H$ and others. In a magnetic field of, for example, 14,092 gausses, the nuclear magnetic resonance frequencies of the atoms of $^1H$, $^{19}F$, $^{13}C$, and $^2H$ are respectively 60.0 MHz, 56.4 MHz, 15.1 MHz, and 9.2 MHz. A conventional receiver circuit for receiving nuclear magnetic resonance signals of two different frequencies, such as the two signals resulting respectively from the analysis system and the locking system of the analyser, comprises individual resonance circuits for each of the two output signal frequencies and separate amplifiers for each of the respective resonance circuit output signals. As will later be described with reference to one of the accompanying drawings, a conventional receiver circuit of this type causes the signal-to-noise ratio of the receiver output signals to be poor. This circuit is also incapable of preventing a signal component having the frequency of the locking system magnetic field which is applied to the sample, from leaking into the receiver output signal. This leakage signal component from the locking system renders the analyser unstable and requires the frequent adjustment of the locking system.

SUMMARY OF THE INVENTION

It is therefore an object of the present invention to provide a receiver circuit for a nuclear magnetic resonance analyser, comprising a single resonance circuit for simultaneously receiving nuclear magnetic resonance signals of different frequencies.

It is another object of this invention to provide a receiver circuit of the type described, capable of producing receiver output signals having excellent signal-to-noise ratios.

It is still another object of this invention to provide a receiver circuit of the type described which is, capable of substantially preventing signal components having the frequency of the high-frequency magnetic field applied to the sample from leaking into the receiver output.

It is a further object of this invention to provide a receiver circuit of the type described, which is capable of insuring stable operation of the nuclear magnetic resonance analyser.

It is a still further object of this invention to provide a receiver circuit of the type described for use in a nuclear magnetic resonance analyser including a locking system, which will make adjustment of that locking system substantially unnecessary.

A receiver circuit for a nuclear magnetic resonance analyser simultaneously receives nuclear magnetic resonance signals of two different discrete frequencies comprises resonance circuit means for detecting the resonance signals, and for producing resonance circuit output signals in response to said resonance signals and amplifier means for amplifying the resonance circuit output signals to produce receiver output signals representative of the respective resonance signals. In accordance with this invention, the resonance circuit of the receiver includes a crystal resonator whose impedance-versus-frequency characteristics are such that the lower of the two different frequencies to be received lies above and in the vicinity of the series resonance frequency of the crystal resonator and the higher of the different frequencies lies above the parallel resonance frequency of the crystal resonator. The crystal resonator is therefore able to serve substantially as an inductive element for the lower frequency and substantially as a capacitive element for the higher frequency so that a single resonance circuit operates in effect as two different resonance circuits one at each of the respective frequencies. In addition, it is possible to match the output impedance of the resonance circuit to the input impedance of the amplifier means to which it is connected at both frequencies of interest and consequently a single amplifier can be used to amplify both the resonance circuit output signals. As will be described in detail in the following, it is possible with this arrangement to prevent the signal-to-noise ratio of the higher frequency signal from degenerating and by providing a crystal resonator of high Q-value to avoid the leakage of a signal component having the frequency of the magnetic field for the lower frequency into the receiver output signal.

BRIEF DESCRIPTION OF THE DRAWINGS

FIG. 1 schematically shows a conventional receiver circuit for receiving nuclear magnetic resonance signals of two different frequencies;

FIG. 2 schematically shows the intensity of the resonance signal of a locking system of a nuclear magnetic resonance analyser versus the strength of the magnetic field;

FIG. 3 is a schematic circuit diagram of a first embodiment of the instant invention;

FIG. 4 schematically shows the impedance-versus-frequency characteristics of a crystal resonator;

DESCRIPTION OF THE PREFERRED EMBODIMENTS

Figure 5:
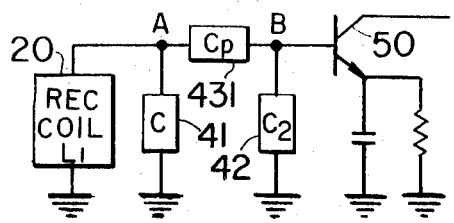
FIG. 5 shows an equivalent circuit of the resonance circuit of the receiver circuit of FIG. 3 for a higher frequency signal.

Referring to FIG. 1, a conventional receiver circuit which is used for nuclear magnetic resonance signals of two different frequencies will briefly be described before describing a few preferred embodiments of the present invention in order to facilitate understanding of this invention. The receiver circuit comprises resonance circuit means and amplifier means. The resonance circuit means includes a receiving coil 20 for picking up nuclear magnetic resonance signals of a higher frequency $f_1$ and a lower frequency $f_2$ which are generated by a sample (not shown) to which a high-frequency magnetic field is applied by an irradiation coil (not shown). For convenience in the following description, it may be assumed that the higher and the lower frequency signals result respectively from the analysis system and the locking system of a nuclear resonance analyser. A first resonance circuit for the higher frequency signal $f_1$ comprises capacitive elements 21, 22, and 23 together with the receiving coil 20. A parallel resonance circuit including an inductive element 25 and a capacitive element 26 is tuned to the higher frequency $f_1$. A combination of the receiving coil 20, the parallel resonance circuit including the capacitive elements 25 and 26, and the additional capacitive elements 28 and 29 form a second resonance circuit for the signal of the lower frequency $f_2$. The high impedance which the parallel resonance circuit 25 and 26 presents for the signals of the higher frequency $f_1$ serves to prevent the impedance of the first resonance circuit from appreciably decreasing at the higher frequency $f_1$ even though the additional capacitive elements 28 and 29 are connected to the parallel resonance circuit 25 and 26. The amplifier means comprises a first and a second amplifier for producing receiver output signals $F_1$ and $F_2$ from the resonance circuit output signals corresponding to the higher and lower frequencies $f_1$ and $f_2$, respectively. The first amplifier for the higher frequency comprises field effect transistors 31 and 32. Similarly, the second amplifier for the lower frequency comprises field effect transistors 33 and 34. For the reason described below, a signal of the lower frequency $f_2$ is supplied to the receiver circuit through a bridge circuit comprising the capacitive element 28, the two impedance elements 36 and 37, and one of the field effect transistors 33 of the second amplifier.

Inasmuch as the impedance of the parallel resonance circuit 25–26 is much higher than the impedance of the additional capacitive elements 28 and 29 at the higher frequency $f_1$, the resonance impedance $Z$ of a combination of the first and second resonance circuits at the higher frequency $f_1$ approximately given by $$Z = 2\pi f_1 Q_1 Q_2 L_1 L_2 / (Q_1 L_1 + Q_2 L_2),$$

where $Q_1$ and $L_1$ are respectively the Q-value and the inductance of the receiving coil 20 and $Q_2$ and $L_2$ are respectively the Q-value and the inductance of the inductive element 25. If the only frequency included in the received nuclear magnetic resonance signal is $f_1$, the receiver circuit will not functionally include the second resonance circuit and amplifier. The resonance impedance $Z'$ of the first resonance circuit 20–21–22–23 is therefore given by $$Z' = 2\pi f_1 Q_1 L_1$$

at the higher frequency $f_1$. The resonance impedance $Z''$ of the parallel resonance circuit 25–26 is given by $$Z'' = 2\pi f_2 Q_2 L_2$$

at the lower frequency $f_2$. The impedance $Z$ of the combined resonance circuit at the higher frequency $f_1$ therefore given by a parallel combination of the impedance $Z'$ of the first resonance circuit 20, 21, 22, 23 at the higher frequency $f_1$ and the impedance $Z''$ of the parallel resonance circuit 25–26 at the lower frequency $f_2$. It is to be noted here that the receiving coil 20 should have the greatest possible number of turns and consequently a high inductance $L_1$; therefore, it is difficult to make the inductive element 25 have an inductance $L_2$ which is significantly greater than the inductance $L_1$ of the receiving coil 20. When for example, the impedance $Z'$ of the first resonance circuit 20, 21, 22, 23 is 100 kilohms at a higher frequency $f_1$ of 15.1 mHz, in order to render the ratio of the total impedance $Z$ of the combined resonance circuit to the impedance $Z'$ of the higher frequency resonance circuit greater than 0.7 at this single higher frequency $f_1$, it is necessary that the impedance $Z''$ of the parallel resonance circuit 25–26 at the lower frequency $f_2$ be greater than 300 kilohms. It is however very difficult to achieve this high an impedance in the parallel resonance circuit 25–26 at the lower frequency $f_2$. It follows therefore that a decrease in the total impedance $Z$ of the combined resonance circuit is inevitable despite the relatively high impedance of the parallel resonance circuit 25–26 at the higher frequency $f_1$. Because of this decrease in the total impedance $Z$ the effective Q-value of the receiving coil 20 will be reduced accordingly. Inasmuch as the signal-to-noise ratios of the receiver output signals are proportional to the Q-value of the receiving coil, a conventional receiver circuit of the type shown in FIG. 1, which is designed to receive two frequencies, produces receiver output signals of relatively poor signal-to-noise ratios as compared with a receiver circuit designed for a nuclear magnetic resonance signal of a single frequency.

In order to make the present invention more understandable a brief description will be given of the operation of a nuclear magnetic resonance analyser. A nuclear magnetic resonance analyser applies a magnetic field of a radio frequency $f$ to a sample. The radio frequency magnetic field is modulated at an audio frequency $f_m$. The sample is therefore supplied with magnetic field components having the side band frequencies $f \pm f_m, f \pm 2f_m, \ldots$ to produce nuclear magnetic resonance signals having first side band frequencies of $f \pm f_m$, which signals are detected by the receiving coil 20. The coil 20 also picks up a signal of the fundamental frequency of the magnetic field $f$. In order to prevent the signal component of the fundamental frequency $f$ from appearing in the receiving coil 20, an irradiation coil is disposed perpendicularly to the receiving coil 20 and auxiliary coil means (not shown) are used for finely adjusting the distribution of the magnetic field at the area of the sample. Inasmuch as this adjustment is dependent on frequency and is possible only over a very narrow range of frequencies, it is difficult by use of auxiliary coil means to simultaneously prevent the leakage of signal components of fundamental frequencies corresponding to both the higher and lower frequencies $f_1$ and $f_2$ since these frequencies are spaced further apart than the applicable frequency adjustment range of the auxiliary coil means. The leakage of the fundamental frequency signal component having the higher frequency $f_1$ can be prevented by the fine adjustment of the auxiliary coil. The leakage of the fundamental frequency signal component having the lower frequency $f_2$ is then avoided by the application of a signal of the lower frequency $f_2$ or, more exactly, the signal of the fundamental frequency of the magnetic field for the lower frequency $f_2$ to the bridge circuit mentioned above, which bridge circuit includes capacitive element 28, the two impedance elements 36 and 37, and transistor 33. By this means the signal component $f_2$ can be effectively cancelled so that it does not appear in the output.

Referring now to FIG. 2, the intensity of the nuclear magnetic resonance signal resulting from the locking system of the resonance analyser is approximately symmetric with respect to a given point on the abscissa which point represents a particular magnetic field strength $H_0$. This makes it possible to lock the strength of the magnetic field to the particular field strength $H_0$ by using the resonance signal to the current flowing through the coil of the electromagnet which produces the magnetic field.

In view of the above-described principles of the locking system, it is to be noted that the balance of the bridge circuit of a conventional receiver as shown in FIG. 1 will be upset not only by fluctuations in the ambient conditions, such as temperature, but also by the degree of control of the electromagnet current of the lower frequency $f_2$. The receiver circuit therefore inevitably produces an undesired receiver output signal corresponding to the fundamental frequency signal for the lower frequency $f_2$ which causes fluctuations in the direct-current level of the receiver output signal corresponding to the nuclear magnetic resonance signal of the lower frequency $f_2$. This undesired receiver output signal in turn causes fluctuations in the intensity of the magnetic field which adversely effect the stability of the locking operation. In prior art receivers of this type it has therefore been necessary to frequently adjust the locking system by making an additional direct current compensation for the fluctuations in the direct-current level.

Referring now to FIG. 3, a first embodiment of this inventive circuit for simultaneously receiving nuclear magnetic resonance signals of two different discrete frequencies $f_1$ and $f_2$ comprises a single resonance circuit for picking up both the resonance signals $f_1$ and $f_2$ to produce two resonance circuit output signals. A single amplifier is used for amplifying these resonance circuit output signals to produce receiver output signals $F_1$ and $F_2$ corresponding to the respective resonance signals. The resonance circuit comprises a first and a second capacitive element 41 and 42 connected in parallel with the receiving coil 20. A crystal resonator 43 is connected between the capacitive elements 41 and 42 and in series with the receiving coil 20. The equivalent circuit of a crystal resonator comprises a parallel circuit including a series circuit comprising an inductance $L_s$, a capacity $C_s$, and a resistance $R_s$ which is connected in parallel with another capacity $C_p$.

Referring to FIG. 4, the impedance of a crystal resonator is zero at a given zero point frequency $f_0$ and approaches infinity as the frequency of the signal supplied to the crystal resonator approaches a pole frequency $f_p$. In the frequency ranges below the zero point frequency $f_0$ and above the pole frequency $f_p$, the impedance of the series circuit including the inductance $L_s$ and the capacity $C_s$ is higher than the impedance of the parallel capacity $C_p$ so that the impedance of the crystal resonator is substantially equivalent to that of the capacitive element of the parallel capacity $C_p$. In the frequency range between the zero point frequency $f_0$ and the pole frequency $f_p$, the impedance of the crystal resonator is substantially determined by the impedance of the series resonance circuit which includes inductance $L_s$ and the capacity $C_s$ and the crystal resonator is substantially equivalent to an inductive element for this range of frequencies. The crystal resonator 43 used in the resonance circuit of the first embodiment is chosen such that the higher frequency $f_1$ of the two different discrete frequencies to be received lies above the parallel resonance frequency $f_p$ of the crystal resonator 43 and the lower frequency $f_2$ lies between the series resonance frequency $f_0$ and the parallel resonance frequency $f_P$ of the crystal resonator 43.

Referring to FIG. 5, an equivalent circuit of the resonance circuit of the first embodiment of FIG. 3 for signals of the higher frequency $f_1$ comprises a capacitive element 431 representing the parallel capacity $C_p$ of the crystal resonator and shown in place of the crystal resonator 43 of FIG. 3. The impedances $Z_A$ and $Z_B$ measured at points A and B which are respectively the connections between the crystal resonator 43 and the first and second capacitive elements 41 and 42 as shown in FIG. 3 are given by $$Z_A = 2\pi f_1 L_1 Q_1 \tag{1}$$

and $$Z_B = 2\pi f_1 L_1 Q_1 C_p^2/(C_p + C_2)^2 \tag{2}$$

where $C_2$ represents the capacity of the second capacitive element 42. From Equation (1), it is seen that the impedance $Z_A$ at the A point at the higher frequency $f_1$ is equal to the impedance of the resonance circuit of the receiver for a nuclear magnetic resonance signal of a single frequency even though the resonance ciructit of this first embodiment is able to detect the lower frequency nuclear magnetic resonance signal equally well.

Figure 6:
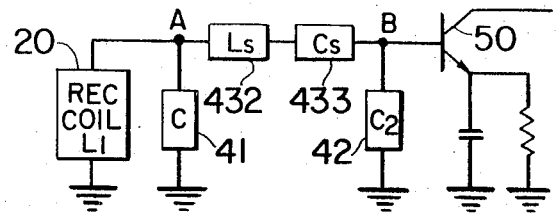
FIG. 6 shows an equivalent circuit of the resonance circuit of the receiver circuit of FIG. 3 for a lower frequency signal.

Referring to FIG. 6, an equivalent circuit of the resonance circuit of the first embodiment of FIG. 3 for signals of the lower frequency $f_2$ comprises a series circuit which includes an inductive element 432 of the inductance $L_s$ and a capacitive element 433 of the capacity $C_s$ in place of the crystal resonator 43 shown in FIG. 3. Inasmuch as the first capacitance element 41 exhibits a sufficiently larger impedance at the lower frequency $f_2$ than the impedance of the receiving coil 20, it is possible to neglect the first capacitive element 41 when the resonance circuit shown in FIG. 3 is tuned to the lower frequency $f_2$. The equation $$f_2 = 1/[2\pi(L_1 + L_s)C], \quad (3)$$

where $C = C_sC_2/(C_s + C_2)$, therefore gives the relation between the lower frequency $f_2$ and the circuit constants of the equivalent circuit illustrated in FIG. 6. From Equation (3), the impedances $Z_A$ and $Z_B$ at the points A and B shown in FIG. 6 for frequency $f_2$ are then given by $$Z_A = 2\pi f_2[L_1/(L_1 + L_s)]^2 Q_0$$

and $$Z_B = 2\pi f_2[C_s/(C_s + C_2)]^2 Q_0, \quad (4)$$

where $Q_0$ represents the Q-value of the crystal resonator 43.

Turning back to FIG. 3, the amplifier portion of the receiver circuit of the first embodiment comrpises a transistor 50 connected to the point B of the resonance circuit, a parallel resonance circuit tuned to the higher frequency $f_1$ and comprising an inductive element 51 and a capacitive element 52 connected to the collector of the transistor 50. A series resonance circuit tuned to the lower frequency $f_2$ comprises a series connection of inductive element 53 and a capacitive element 54 connected to the collector of the transistor 50 through a single inductive element 57 and a blocking capacitor 58. A first capacitive element 61 is connected between the collector of transistor 50 and ground a second capacitive element 62 is connected in parallel to the series resonance circuit including inductor element 53 and capacitive element 54. A third capacitive element 63 is connected in series with the parallel resonance circuit 51 and 52, and a fourth capacitive element 64 is connected between the third capacitive element 63 and ground. The receiver output signal $F_1$ corresponding to the nuclear magnetic resonance signal of the higher frequency $f_1$ is derived from the point of connection between the blocking capacitor 58, the series resonance circuit 53 and 54, and the second capacitive element 62. The receiver output signal $F_2$ corresponding to the nuclear magnetic resonance signal of the lower frequency $f_2$ is derived from the point of connection between the third and the fourth capacitive elements 63 and 64. From Equations (2) and (4), it is possible to match the output impedance of the resonance circuit to the input impedance of the amplfiier circuit at both the higher and lower frequencies $f_1$ and $f_2$.

Figure 7:
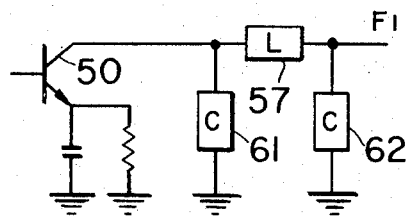
FIG. 7 shows an equivalent circuit of the amplifier circuit of the receiver circuit of FIG. 3 for the higher frequency signal.
Figure 8:
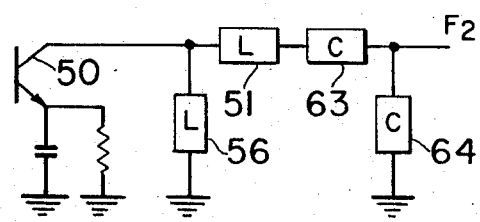
FIG. 8 shows an equivalent circuit of the amplifier circuit of the receiver circuit of FIG. 3 for the lower frequency signal.

Referring to FIG. 7 showing an equivalent circuit of the amplifier at the higher frequency $f_1$, it will be seen that the resonance circuit output signal corresponding to the nuclear magnetic resonance signal of the higher frequency $f_1$ is amplified by a combination of the transistor 50, the single inductive element 57, and the first and the second capacitive elements 61 and 62. Referring to FIG. 8 showing the equivalent circuit of the amplifier for the lower frequency $f_2$, it is seen that the resonance circuit output signal corresponding to the lower frequency nuclear magnetic resonance signal is amplified by the combination of the transistor 50, the single inductive element 57, the inductive element 51 of the parallel resonance circuit, and the third and fourth capacitive elements 63 and 64. In view of the above it can be seen that the amplifier can be designed so that it is impedance matched to the resonance circuit at both the resonance circuit output frequencies and is therefore capable of amplifying the rsonance circuit output signals corresponding to the nuclear magnetic resonacne signal of both frequencies.

Inasmuch as the Q-value of a crystal resonator is remarkably high, the passband width $\Delta B$ of the crystal resonator 43 as given by $$\Delta B = f_2/Q_0$$

is narrow. For a lower frequency $f_2$ of 9 MHz which would result from a magnetic field of 14,000 gauss in a locking system which make use of the nuclei of $^2H$, the passband width between the −3 dB points of the crystal resonator will be several hundred hertz. By setting the center frequency of the passband at the lower frequency $f_2$ of the nuclear magnetic resonance signal and by making the magnetic field modulation frequency $f_m$ sufficiently greater than the passband width, it is possible to suppress the signal component resulting from the fundamental frequency of the magnetic field for the lower frequency nuclear magnetic resonance signal which would otherwise leak into the resonance circuit output signals.

By way of example, the circuit constants of the first embodiment may be as follows:

$L_1$ of the receiving coil 20 is 12 $\mu H$,

C of the first capacitive element 41 is within the range of 1.4 to approximately 13pF, $C_2$ of the second capacitive element 42 is 10 $_pF$, The resonance frequency of the crystal resonator 43 is 9.1 MHz, Tansistor 50 may be of the 2S C800 type as manufactured by Nippon Electric Co., L of the inductive element 51 is 4.7 $\mu H$, C of the capacitive element 52 is 22 $_pF$, L of the inductive element 53 is 2.2 $\mu H$, C of the capcitive element 54 is 120 $_pF$, L of the single inductive element 57 is 2.7 $\mu H$, C of the blocking capacitor 58 is 2.2 $\mu F$, C of the first capacitive element 61 is within the range of 33 to about 45 $_pF$, C of the second capacitive element 62 is 150 $_pF$, C of the third capacitive element 63 is 120 $_pF$, and C of the fourth capcitive element 64 is 150 $_pF$.

Figure 9:
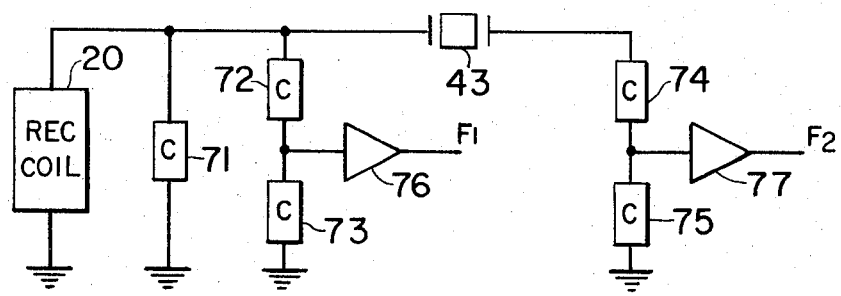
FIG. 9 is a schematic circuit diagram of a second embodiment of this invention.

Referring now to FIG. 9, a second embodiment of this invention comprises a crystal resonator 43 connected in series to the receiving coil 20. A common capacitive element 71 is connected in parallel with the receiving coil 20. A first set of series connected capacitive elements 72 and 73 are connected between the connection point of the receiving coil 20 and crystal resonator 43 and ground. A second set of series connected capacitive elements 74 and 75 is connected between the crystal resonator 43 and ground. A first amplifier 76 is connected to the point of connection between the first set of capacitive elements 72 and 73, and a second amplifier 77 is connected to the point of connection between the second set capacitive elements 74 and 75. As in the first embodiment, the crystal resonator 43 is such that the higher frequency $f_1$ of the two different discrete frequencies lies above the parallel resonance frequency $f_P$ of the crystal resonator 43 and that the lower frequency $f_2$ lies between the series resonance frequency $f_O$ and the parallel resonance frequency $f_P$ of the crystal resonator 43. The receiver output signals $F_1$ and $F_2$ corresponding respectively to the nuclear magnetic resonance signals of the higher and lower frequencies $f_1$ and $f_2$ are derived from the outputs of the first and second amplifiers 76 and 77, respectively. The parallel capacity $C_P$ of the crystal resonator 43 is arranged to be significantly smaller than the capacity of either the common capacitive element 71 or the first set capacitive elements 72 and 73.

Figure 10:
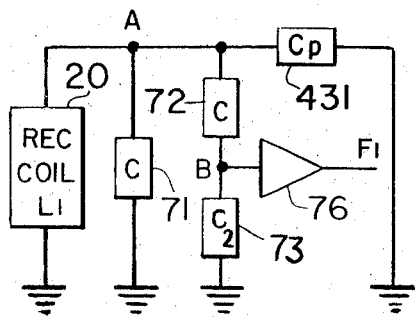
FIG. 10 shows an equivalent circuit of the second embodiment for a higher frequency signal.
Figure 11:
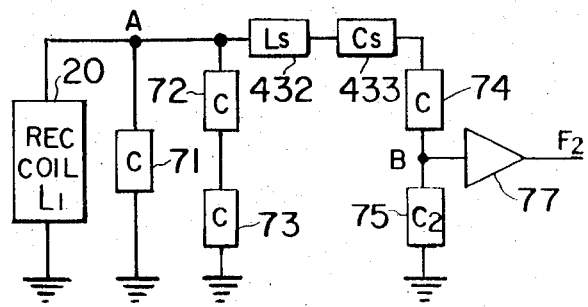
FIG. 11 shows an equivalent circuit of the second embodiment for a lower frequency signal.

Referring to FIG. 10, an equivalent circuit of the second embodiment for the higher frequency $f_1$ comprises a capacitive element 431 of the parallel capacity $C_P$ in place of the crystal resonator 43 shown in FIG. 9. The parallel capacity $C_P$ of the equivalent capacitive element 431 of the crystal resonator 43 is small as compared with other capacitive elements 71, 72, and 73. This capacitive element 431 together with the common capacitive element 71 and the set capacitive element 72 corresponds to the combination of the first capacitive element 41 and capacitive element 431 of the resonance circuit of FIG. 5; the output point B is therefore functionally the same as the point B described in conjunction with the first embodiment as shown in FIG. 5. It will be seen that Equations (1) and (2) above hold true, for this second embodiment. The capacitive element 73 serves as the second capacitive element of the resonance circuit corresponding to element 42 in FIG. 5. Referring to FIG. 11, an equivalent circuit of the second embodiment for the lower frequency $f_2$ comprises a series connection of an inductive element 432 of the inductance $L_s$ and a capacitive element 433 of the series capacity $C_s$ in place of the crystal resonator 43 illustrated in FIG. 9. The common capacitive element 71 and the first set capacitive elements 72 and 73, on the one hand, and the equivalent series capacitive element 433 and the capacitive element 74, on the other hand, correspond respectively to the first capacitive element 41 of the resonance circuit described with reference to the first embodiment in FIG. 6 and the equivalent series capacitive element 432 illustrated in connection therewith. The equation for the input impedance $Z_A$ and Equation (4) hold for the lower frequency $f_2$ of this embodiment as well as the first embodiment. From FIGS. 10 and 11, it is also seen that the output impedances of the resonance circuit given by Equations (2) and (4) for the higher and lower frequencies $f_1$ and $f_2$, as more fully described above for the first embodiment, may be matched to the input impedances of the respective amplifiers 76 and 77.

What is claimed is:

1. A receiver circuit in a nuclear magnetic resonance analyzer for simultaneously receiving nuclear magnetic resonance signals of a first and a second discrete frequency comprising resonance circuit means to produce resonance circuit output signals in response to said nuclear magnetic resonance signals and amplifier means connected to said resonance circuit means to amplify said resonance circuit output signals to produce receiver output signals corresponding to said nuclear magnetic resonance signals;

said resonance circuit means including a receiving coil for detecting said nuclear magnetic resonance signals and a crystal resonator, said crystal resonator being connected in series between said receiving coil and said amplifying means, said crystal resonator having impedance characteristics such that said resonator performs substantially as an inductive element at said first frequency and substantially as a capacitive element at said second frequency.

2. A receiver circuit as claimed in claim 1, wherein the impedance-versus-frequency characteristics of said crystal resonator are chosen such that said first frequency lies above the series resonance frequency of said crystal resonator and said second frequency lies above the parallel resonance frequency of said crystal resonator.

3. A receiver circuit as claimed in claim 1, wherein said first frequency is within the passband of said crystal resonator.

4. A receiver circuit as claimed in claim 1, wherein the output impedance of said resonance circuit means is matched to the input impedance of said amplifier means.

5. A receiver circuit for a nuclear magnetic resonance analyser which simultaneously receives nuclear magnetic resonance signals at both a higher and a lower discrete frequency, said receiver circuit including resonance circuit means and amplifier means, said resonance circuit means including a receiving coil for detecting said resonance signals, said coil having a first and a second terminal, said first terminal being connected to a reference voltage, and resonance means including said receiving coil for producing resonance circuit output signals in response to said nuclear magnetic resonance signals detected by said coil, said amplifier means being connected to said resonance circuit means for amplifying said resonance circuit output signals to produce receiver output signals corresponding to said nuclear magnetic resonance signals wherein said resonance circuit means includes a crystal resonator connected to said second terminal of said coil so that siad resonator is connected in series between said receiving coil and said amplifier means, said crystal resonator serving substantially as an inductive element in said resonance circuit means at said lower discrete frequency and as capacitive element in said resonance circuit means at said higher discrete frequency.

* * * * *

UNITED STATES PATENT OFFICE
CERTIFICATE OF CORRECTION

Patent No. 3,858,112                    Dated December 31, 1974

Inventor(s)  Yoshiaki Satoh et al.

It is certified that error appears in the above-identified patent and that said Letters Patent are hereby corrected as shown below:

On the cover sheet, the following should be added:

[30] Foreign Application Priority Data

Sept. 30, 1972      Japan........ 47-97642

Signed and sealed this 22nd day of April 1975.

(SEAL)
Attest:

RUTH C. MASON
Attesting Officer

C. MARSHALL DANN
Commissioner of Patents
and Trademarks